(12) United States Patent
Turner et al.

(10) Patent No.: US 11,325,017 B2
(45) Date of Patent: May 10, 2022

(54) REMOLDABLE IMPACT-ATTENUATION ARTICLE

(71) Applicant: NIKE, Inc., Beaverton, OR (US)

(72) Inventors: David Turner, Portland, OR (US); Jeff Hawes, Beaverton, OR (US)

(73) Assignee: NIKE, Inc., Beaverton, OR (US)

( * ) Notice: Subject to any disclaimer, the term of this patent is extended or adjusted under 35 U.S.C. 154(b) by 149 days.

(21) Appl. No.: 15/404,406

(22) Filed: Jan. 12, 2017

(65) Prior Publication Data

US 2017/0203190 A1     Jul. 20, 2017

Related U.S. Application Data

(60) Provisional application No. 62/278,973, filed on Jan. 14, 2016.

(51) Int. Cl.
*A63B 71/08*   (2006.01)
*B32B 5/18*    (2006.01)
(Continued)

(52) U.S. Cl.
CPC ............ *A63B 71/08* (2013.01); *A41D 13/015* (2013.01); *A41D 31/285* (2019.02); *A63B 71/10* (2013.01); *A63B 71/12* (2013.01); *A63B 71/1225* (2013.01); *B29C 51/004* (2013.01); *B29C 51/145* (2013.01); *B29D 99/0064* (2013.01); *B32B 3/04* (2013.01); *B32B 3/12* (2013.01); *B32B 5/024* (2013.01); *B32B 5/026* (2013.01); *B32B 5/028* (2013.01); *B32B 5/18* (2013.01); *B32B 5/245* (2013.01); *B32B 5/32* (2013.01); *B32B 7/12* (2013.01); *B32B 27/065* (2013.01); *B32B 27/08* (2013.01); *B32B 27/12* (2013.01); *B32B 27/40* (2013.01); *B32B 37/1284* (2013.01); *B32B 37/146* (2013.01);
(Continued)

(58) Field of Classification Search
None
See application file for complete search history.

(56) References Cited

U.S. PATENT DOCUMENTS 5,035,069 A   7/1991   Minden et al.
5,405,312 A   4/1995   Jacobs et al.
(Continued)

FOREIGN PATENT DOCUMENTS

CA   2764089 C   7/2014
DE   4336468 A1  4/1995
(Continued)

OTHER PUBLICATIONS

Brion, M. (2016). Viscoelasticity, Time, and Temperature Dependency. Material Selection for Thermoplastic Parts—Practical and Advanced Information for Plastics Engineer, p. 50 and 53. (accessed Oct. 18, 2018) (Year: 2016).*
(Continued)

*Primary Examiner* — Jeremy R Pierce
*Assistant Examiner* — Christine X Nisula
(74) *Attorney, Agent, or Firm* — Shook, Hardy & Bacon L.L.P.

(57) ABSTRACT

Aspects herein provide for a remoldable article configured to attenuate or reduce the results of an impact. The article comprises a plate that is remoldable in a temperature range of about 41 degrees Celsius to about 43.3 degrees Celsius.

9 Claims, 5 Drawing Sheets

(51) Int. Cl.

| | | |
|---|---|---|
| *B32B 5/24* | (2006.01) | |
| *B32B 5/32* | (2006.01) | |
| *B32B 7/12* | (2006.01) | |
| *B32B 27/12* | (2006.01) | |
| *B32B 27/40* | (2006.01) | |
| *B32B 3/12* | (2006.01) | |
| *B32B 5/02* | (2006.01) | |
| *B32B 27/08* | (2006.01) | |
| *B32B 3/04* | (2006.01) | |
| *B32B 27/06* | (2006.01) | |
| *A41D 31/28* | (2019.01) | |
| *A41D 13/015* | (2006.01) | |
| *A63B 71/10* | (2006.01) | |
| *A63B 71/12* | (2006.01) | |
| *B29C 51/00* | (2006.01) | |
| *B29C 51/14* | (2006.01) | |
| *B29D 99/00* | (2010.01) | |
| *B32B 37/12* | (2006.01) | |
| *B32B 37/14* | (2006.01) | |
| *B32B 37/18* | (2006.01) | |
| *B32B 38/00* | (2006.01) | |
| *B29K 21/00* | (2006.01) | |
| *B29K 23/00* | (2006.01) | |
| *B29K 75/00* | (2006.01) | |
| *B29K 77/00* | (2006.01) | |
| *B29L 31/48* | (2006.01) | |
| *B29L 31/00* | (2006.01) | |

(52) U.S. Cl.
CPC ........ *B32B 37/182* (2013.01); *B32B 38/0012* (2013.01); *A41D 2300/32* (2013.01); *A63B 2071/125* (2013.01); *A63B 2071/1208* (2013.01); *A63B 2071/1233* (2013.01); *A63B 2071/1241* (2013.01); *A63B 2071/1258* (2013.01); *A63B 2071/1275* (2013.01); *A63B 2071/1283* (2013.01); *B29K 2021/00* (2013.01); *B29K 2023/0633* (2013.01); *B29K 2075/00* (2013.01); *B29K 2077/00* (2013.01); *B29L 2031/48* (2013.01); *B29L 2031/768* (2013.01); *B32B 2266/025* (2013.01); *B32B 2266/0207* (2013.01); *B32B 2266/0257* (2013.01); *B32B 2266/0292* (2013.01); *B32B 2305/022* (2013.01); *B32B 2305/024* (2013.01); *B32B 2305/38* (2013.01); *B32B 2307/54* (2013.01); *B32B 2307/558* (2013.01); *B32B 2307/56* (2013.01); *B32B 2307/724* (2013.01); *B32B 2307/738* (2013.01); *B32B 2319/00* (2013.01); *B32B 2323/046* (2013.01); *B32B 2375/00* (2013.01); *B32B 2377/00* (2013.01); *B32B 2437/00* (2013.01); *B32B 2571/00* (2013.01)

(56) References Cited

U.S. PATENT DOCUMENTS

| | | | |
|---|---|---|---|
| 5,450,625 A | 9/1995 | Hu | |
| 5,555,584 A | 9/1996 | Moore et al. | |
| 5,890,224 A | 4/1999 | Clark | |
| 5,918,309 A * | 7/1999 | Bachner, Jr. | A41D 31/245 2/2.5 |
| 6,093,468 A * | 7/2000 | Toms | A41D 13/0158 428/67 |
| 6,145,134 A | 11/2000 | Davis et al. | |
| 6,269,485 B1 | 8/2001 | Foreman | |
| 6,490,730 B1 | 12/2002 | Lyden | |
| 6,703,142 B2 | 3/2004 | Snow | |
| 8,261,369 B2 | 9/2012 | Sioui et al. | |
| 8,414,811 B1 | 4/2013 | De Santis et al. | |
| 9,000,059 B2 | 4/2015 | Rich | |
| 2010/0024105 A1 | 2/2010 | Sims | |
| 2010/0077634 A1* | 4/2010 | Bell | A41D 27/24 36/54 |
| 2010/0319097 A1* | 12/2010 | Turner | A41D 13/05 2/22 |
| 2011/0083340 A1 | 4/2011 | Leary et al. | |
| 2012/0090068 A1 | 4/2012 | Glass et al. | |
| 2012/0180191 A1 | 7/2012 | McNamee | |
| 2013/0025036 A1* | 1/2013 | Turner | A42B 3/125 2/455 |
| 2014/0082811 A1* | 3/2014 | Perlmutter | A41D 13/08 2/16 |
| 2014/0245525 A1* | 9/2014 | Turner | A41H 43/00 2/455 |
| 2014/0298558 A1 | 10/2014 | Dodd | |
| 2015/0128335 A1 | 5/2015 | Dehni | |
| 2016/0333152 A1* | 11/2016 | Cook | B29C 64/106 |
| 2017/0001091 A1* | 1/2017 | Holmes | A63B 71/081 |
| 2017/0127748 A1* | 5/2017 | Sethumadhavan | A42B 3/063 |
| 2019/0239581 A1* | 8/2019 | Rat | A01K 13/007 |

FOREIGN PATENT DOCUMENTS

| | | | | |
|---|---|---|---|---|
| WO | WO-2013150472 A1 * | 10/2013 | | A41D 27/12 |
| WO | 2014143153 A1 | 9/2014 | | |

OTHER PUBLICATIONS

BASF: Technical Information Thermoplastic Polyurethane Elastomers ("TPU"), Nov. 1, 2011 (Nov. 1, 2011), XP055287870, Retrieved from the Internet: URL:http://www.polyurethanes.basf.de/pu/solutions/us/function/conversions:/publish/content/group/Arbeitsgebiete_und_Produkte/Thermoplastische_Spezialelastomere/Infomaterial/elastollan_material_uk.pdf [retrieved on Jul. 12, 2016] pp. 7-8.

Anonymous: "Thermoplastic—Wikipedia. the free encyclopedia", Nov. 25, 2015 (Nov. 25, 2015), XP055362249, Retrieved from the Internet: URL:https://web-beta.archive.org/web/20151125104537/https://en.wikipedia.org/wiki/Thermoplastic [retrieved on Apr. 5, 2017].

International Search Report and Written Opinion dated Apr. 13, 2017 in International Patent Application No. PCT/US2017/013284, 15 pages.

"EvoShield, Game-Changing Protective Apparel," Evoshield, evoshield.com, 2015. http://www .evoshield. com/technology/fitting.

"Soccer Player's Buying Guide—Soccer ShinGuard," World Soccer Shop™, worldsoccershop.com Last Accessed May 21, 2015 http://www.worldsoccershop.com/buyers-guide-shinguards.html.

Hirschfeld, Cindy, "Gear for a Snowy Getaway—XC 120," The New York Times, nytimes.com, Dec. 11, 2014. http://www.nytimes.com/2014/12/14/travel/gear-for-a-snowy-getaway.html?_r=0.

International Preliminary Report on Patentability dated Jul. 26, 2018 in International Patent Application No. PCT/US2017/013284, 8 pages.

Office Action received for European Patent Application No. 17705979.7, dated Mar. 31, 2020, 4 pages.

Office Action received for European Patent Application No. 17705979.7, dated Oct. 2, 2020, 5 pages.

Intention to Grant received for European Patent Application No. 17705979.7, dated Aug. 31, 2021, 8 pages.

* cited by examiner

REMOLDABLE IMPACT-ATTENUATION ARTICLE

CROSS-REFERENCE TO RELATED APPLICATIONS

This application having U.S. application Ser. No. 15/404,406, filed Jan. 12, 2017, entitled "Remoldable Impact-Attenuation Article" claims the benefit of priority of U.S. Prov. App. No. 62/278,973, entitled "Remoldable Impact-Attenuation Article, and filed Jan. 14, 2016. The entirety of the aforementioned application is incorporated by reference herein.

TECHNICAL FIELD

This application is related to an article that is remoldable and that may be used to attenuate an impact.

BACKGROUND

Not Applicable.

BRIEF DESCRIPTION OF THE DRAWINGS

The technology is described in detail herein with reference to the attached drawing figures, which are incorporated herein by reference, wherein.

DETAILED DESCRIPTION

Subject matter is described throughout this Specification in detail and with specificity in order to meet statutory requirements. But the aspects described throughout this Specification are intended to be illustrative rather than restrictive, and the description itself is not intended necessarily to limit the scope of the disclosure or the claims. Rather, the claimed and disclosed subject matter might be practiced in other ways to include different elements or combinations of elements that are similar to the ones described in this Specification and that are in conjunction with other present, or future, technologies. Upon reading the present disclosure, alternative aspects may become apparent to ordinary skilled artisans that practice in areas relevant to the described aspects, without departing from the scope of this disclosure. It will be understood that certain features and subcombinations are of utility and may be employed without reference to other features and subcombinations. This is contemplated by, and is within the scope of, the claims.

Figure 6:
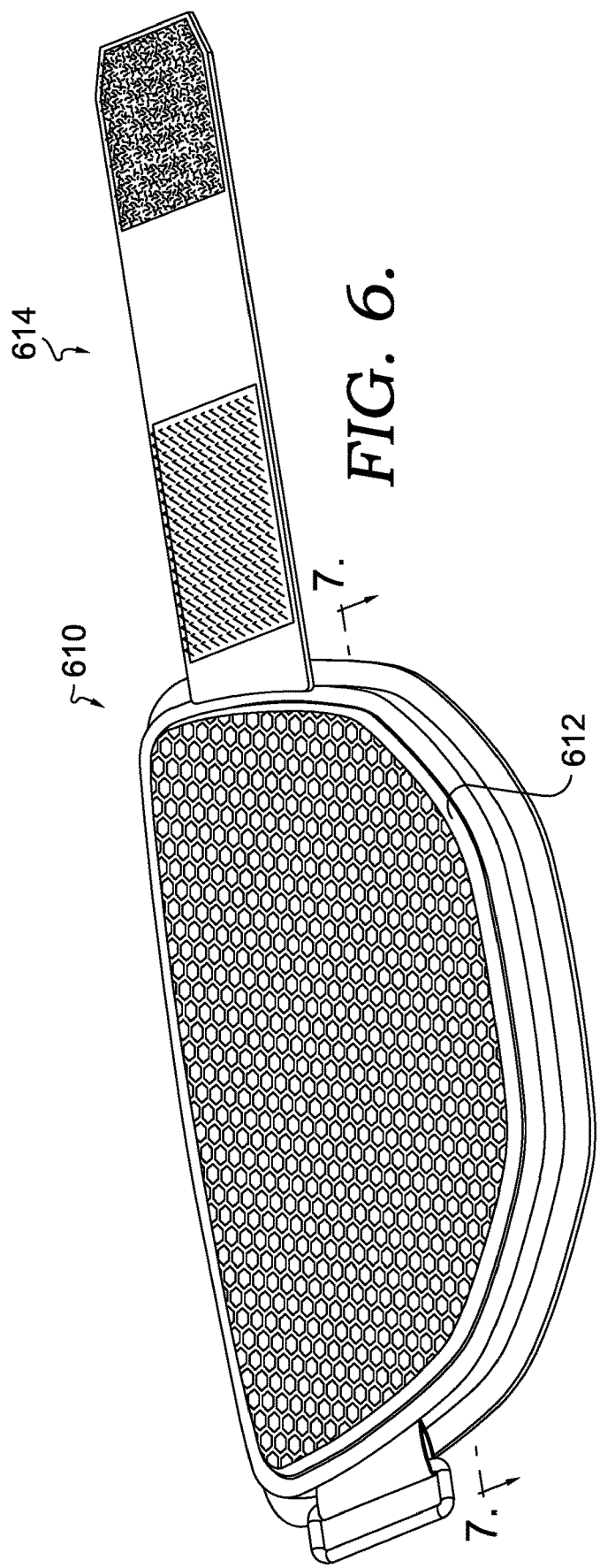
FIG. 6 depicts an article with a remoldable impact-attenuation plate in accordance with an aspect hereof.
Figure 7:
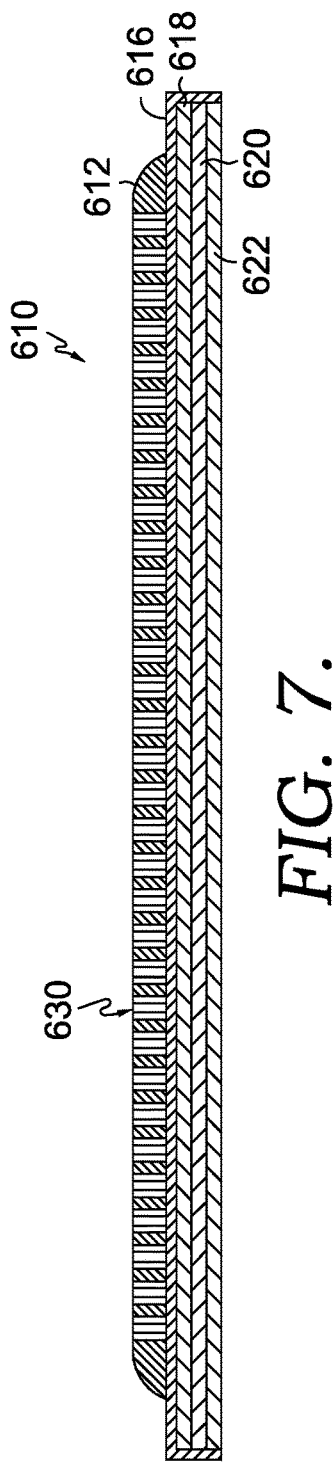
FIG. 7 depicts a cross-sectional view of the article in FIG. 6 taken along reference line 7-7.
Figure 8:
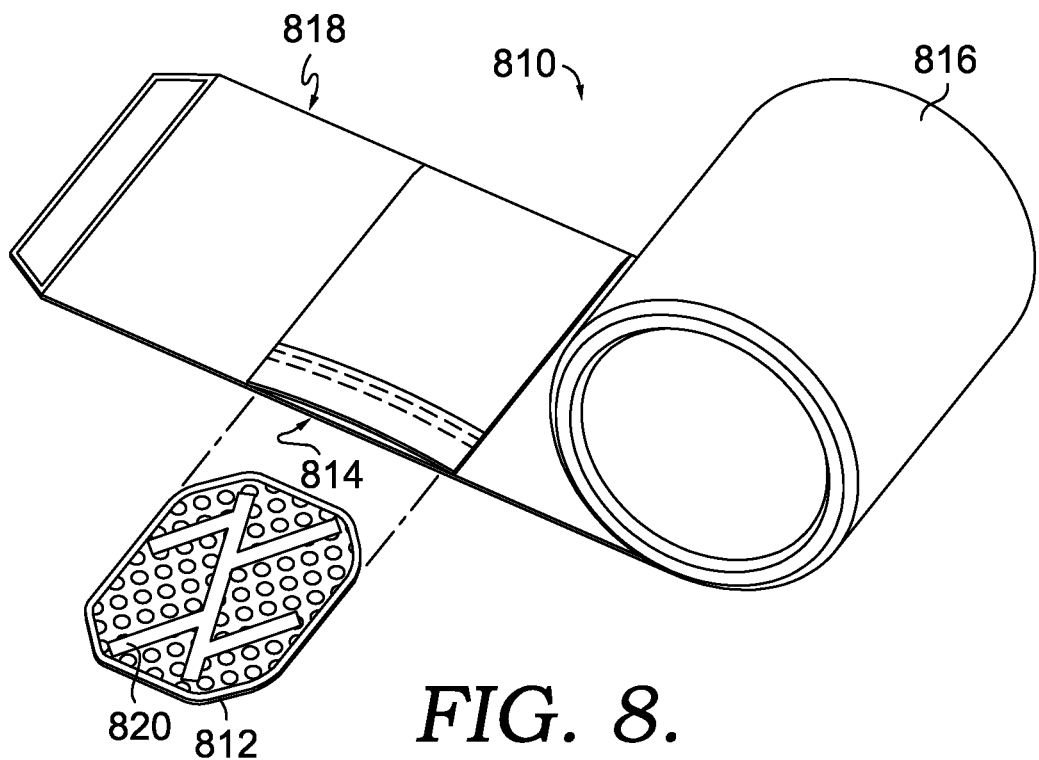
FIG. 8 depicts an alternative article with a remoldable impact-attenuation plate in accordance with an aspect hereof.

At a high level, the disclosure describes a remoldable article configured to attenuate or reduce the results of an impact. Among other things, the article includes an impact plate (or simply "plate") that may be discrete or that may be coupled with one or more other layers, such as a cushion layer or padding layer. For illustrative purposes, an exemplary impact plate is depicted in FIGS. 1-5. In addition, FIGS. 6-8 depict a remoldable impact plate that is combinable with one or more other layers in a protective article. These various figures will be described in greater detail in other portions of this disclosure. In one aspect of the present disclosure, the impact plate is remoldable at elevated temperatures to change an impact-plate configuration or contour, such as by increasing or decreasing a curvature of the impact plate. The impact plate may be repeatedly re-shaped or remolded to adjust the impact-plate configuration.

Exemplary Aspect of an Impact Plate

Figure 1:
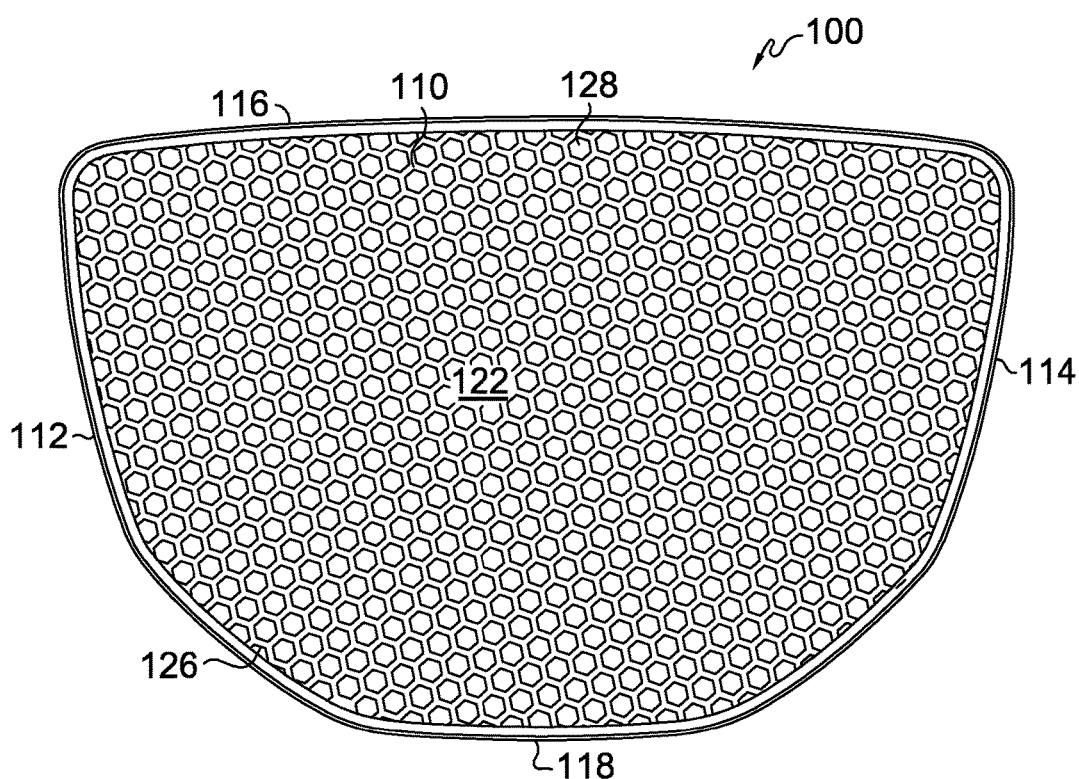
FIGS. 1 and 2 depict respective views of a remoldable impact-attenuation plate in accordance with an aspect hereof.
Figure 2:
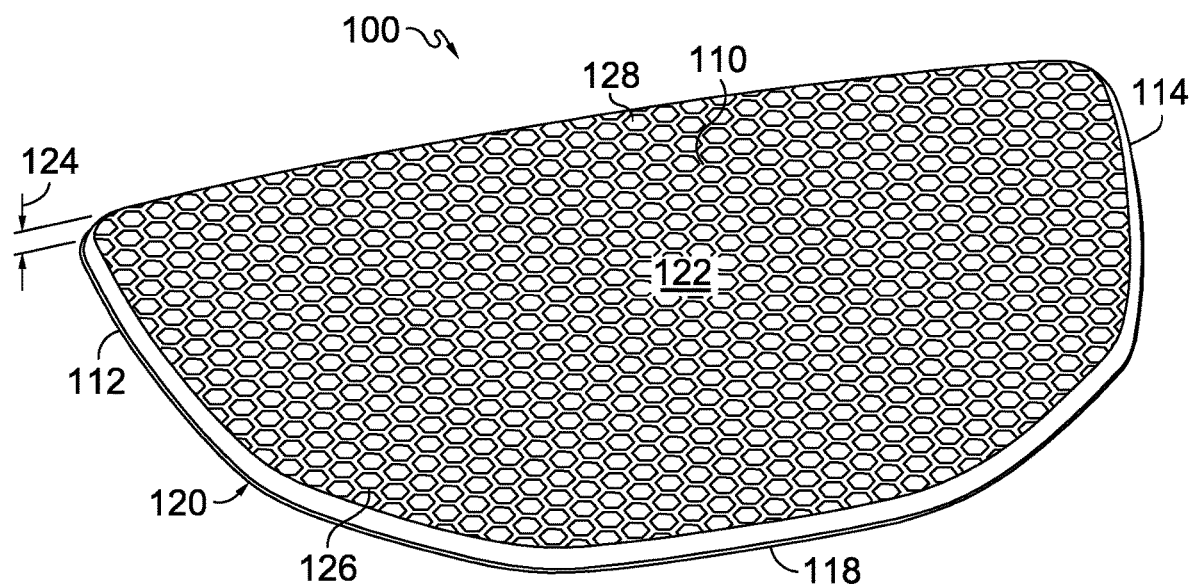

Referring now to FIGS. 1 and 2 an exemplary impact plate 100 is depicted. The impact plate 100 generally includes a perimeter edge that defines a plate body 110, and in FIGS. 1 and 2, the perimeter edge generally includes a left edge 112, right edge 114, top edge 116, and bottom edge 118. (These relative locations and identifiers are provided for descriptive purposes only and are not necessarily meant to define a clear demarcation between each respective edge.) The plate body 110 generally includes a first surface 120 (facing away in the depictions provided by FIGS. 1 and 2) and a second surface 122 that generally opposes the first surface 120. The plate body 110 also includes a thickness 124 extending between the first surface 120 and the second surface 122.

As depicted in FIG. 1, the plate body 110 includes a network of walls (e.g., 126) that form a honeycomb-like structure. The network of walls forms a series of tubular cells that are similar to hexagonal prisms in which the opposing bases of each cell are open-ended. As such, the plate body 110 includes various apertures (e.g., 128) extending entirely through the thickness, from the first surface 120 to the second surface 122 of the plate body 110. Each wall 126 may have various dimensions. For example, each wall 126 may include a wall height that extends from the first surface 120 to the second surface 122, and the wall height may constitute the plate thickness at that particular position of the plate body 110. In addition, each wall 126 may include a substantially uniform thickness as the wall 126 extends from the first surface 120 to the second surface 122. However, in other aspects, one or more of the walls 126 may taper from a larger thickness near the first surface 120 to a smaller thickness near the second surface 122 or vice versa.

The impact plate 100 may include other configurations, alternative to the honeycomb structure. For example, the network of walls may form three-sided cells (e.g., triangular), four-sided cells (e.g., grid-like cubes or rectangular prisms), five-sided cells (e.g., pentagonal), or cells with a greater number of sides. Alternatively, the impact plate 100 may be a solid sheet of impact-plate material that may or may not include apertures positioned in various locations within the plate body 110.

In one aspect, the impact plate 100 may include a relatively uniform thickness as the plate body 110 extends from one side of a perimeter edge to an opposing side of the perimeter edge. For instance, the thickness 124 may be substantially constant as the plate body 110 extends from the edge 112 to the edge 114 and from the edge 116 to the edge 118. In this respect, each of the wall heights is substantially similar. And in other aspects, the thickness 124 of the plate body 110 may vary as the plate body 110 extends from one edge to another edge. For example, the second surface 122 may include a convex curvature that extends away from the first surface 120, such that the plate body 110 includes a thicker central region. In other aspects, the plate body 110 may include ribs (e.g., rib 220 in FIG. 3) that extend across the second surface 122 and that have a greater thickness than other non-rib portions of the plate body 110. In this sense, the ribs may protrude from the second surface 122.

In an aspect of the present invention, the impact plate 100 is remoldable when the temperature of the impact plate is elevated to at least a threshold temperature. That is, at or above the threshold temperature, one or more portions of the impact plate 100 can be plastically deformed without fracture by applying a stress or force to the impact plate 100. For instance, an amount of curvature of the impact plate 100 extending from the left edge 112 to the right edge 114 can be increased or decreased.

Various features of the impact plate 100 contribute to its remoldability attributes. For example, in one aspect the impact plate 100 is constructed of an amorphous material (e.g., thermoplastic polymer or co-polymer) having viscoelastic properties and characteristics that change as the material is heated. In one aspect of the present disclosure, the material from which the impact plate 100 is constructed exists in a first state at material temperatures that are below about 106 degrees Fahrenheit. In addition, the material exists in a second state at material temperatures in a range of about 106 degrees Fahrenheit to about 110 degrees Fahrenheit (the range being inclusive of 106 degrees Fahrenheit and 110 degrees Fahrenheit) or in a range of about 41.1 degrees Celsius and 43.3 degrees Celsius (the range being inclusive of 41.1 degrees Celsius and 43.3 degrees Celsius), the second state being different from the first state. As such, the material from which the impact plate 100 is constructed transitions from the first state to the second state at a temperature in the range of about 106 degrees Fahrenheit to about 110 degrees Fahrenheit. This temperature range of about 106 degrees Fahrenheit to about 110 degrees Fahrenheit is above a temperature to which the plate might be unintentionally elevated (such as by leaving the plate in ambient temperatures), and the range is lower than the temperature of water that is dispensed from some common hot water taps (e.g., about 112 degrees Fahrenheit).

One exemplary state transition of the material from which the impact plate 100 is constructed includes a transition from a viscoelastic solid to a viscoelastic liquid. This may feature may also be identified as the vicat softening temperature. For example, the material may be elastically deformable at a temperature less than about 106 degrees Fahrenheit (and above the glass transition temperature of the material). Accordingly, when the impact plate 100 is at the temperature less than about 106 degrees Fahrenheit (and the material is in its elastically deformable state), the impact plate 100 will elastically deform under a given stress to a different configuration (e.g., different curvature) and will return to its pre-stressed configuration when the stress is removed. In addition, the material transitions to a plastically deformable state when the temperature is elevated to within a range of about 106 degrees Fahrenheit to about 110 degrees Fahrenheit. Accordingly, when the temperature of the impact plate 100 is elevated to the temperature within the range of about 106 degrees Fahrenheit to about 110 degrees Fahrenheit (and the material is in its plastically deformable state), the impact plate 100 will plastically deform to a different configuration (e.g., different curvature) under the given stress and will retain the different configuration when the stress is removed. Furthermore, the material transitions back to an elastically deformable state when the temperature is lowered from the elevated temperature to less than about 106 degrees Fahrenheit. Thus, when the temperature of the impact plate 100 (having the different configuration) is lowered from the elevated temperature to a temperature less than about 106 degrees Fahrenheit (and the material transitions to an elastically deformable state), the impact plate 100 will elastically deform under a given stress to a different configuration (e.g., different curvature) and will return to its pre-stressed configuration when the stress is removed.

Other material properties may also contribute to the remoldability of the plate 100 when the temperature is elevated to within the range of about 106 degrees Fahrenheit to about 110 degrees Fahrenheit. For example, the tensile properties of the thermoplastic polymer may change by a percentage when the temperature is adjusted (e.g., elevated) from a first temperature in a first range of about 60 degrees Fahrenheit to about 90 degrees Fahrenheit to an elevated second temperature in a second range of about 106 degrees Fahrenheit to about 110 degrees Fahrenheit (the ranges being inclusive of these temperatures). In one aspect the tensile property changes by a percentage that is in a range of percentages and that reflects a change from a material demonstrating elastic-deformation qualities to a material demonstrating plastic-deformation qualities. For example, the range of percentages may be about 5% to about 95%, about 10% to about 85%, about 10% to about 75%, or about 10% to about 50%. However, these are merely exemplary ranges and other ranges may be possible by adjusting the composition of the thermoplastic polymer.

Various tensile properties may factor into the remoldability of the plate 100, and in one aspect, the change in yield strength at least partially contributes. For example, the yield strength may be decreased by increasing the temperature. That is, the material may include a lower yield strength at elevated temperatures (such as in the range of about 106 degrees Fahrenheit to about 110 degrees Fahrenheit). In other aspects, the dynamic modulus of the thermoplastic polymer represents a material property that is reflective of a change of the material form a relatively rigid state to a relatively malleable state, and a dynamic mechanical analysis may be performed to determine the dynamic modules at various temperatures. For example, the dynamic modulus may be decreased by increasing the temperature. That is, the material may include a lower dynamic modulus at elevated temperatures (such as in the range of about 106 degrees Fahrenheit to about 110 degrees Fahrenheit). Other exemplary tensile properties include the flexural strength (also known as the modulus of rupture), bend strength, fracture strength, or other properties that relate to an amount of strain measured in response to a stress. As previously indicated, with respect to each of these properties, the amount of strain on the material for a given stress generally increases as the temperature is increased into the range of about 106 degrees Fahrenheit to about 110 degrees Fahrenheit.

The impact plate 100 may include various materials. In one aspect the impact plate 100 is constructed of a thermoplastic polymer or co-polymer. For example, the impact plate 100 may be constructed of a polyurethane or a polyurethane alloy. An exemplary polyurethane is made up of various components, including a polyol or a mixture of polyols, an isocyanate, a chain extender, and a catalyst. Among other things, the polyol or mixture of polyols provides functional hydroxyl groups for reaction (i.e., acts as nucleophile). In addition, the mixture of polyol one or more polyols may be selected in various ratios (e.g., based on molecular weight) to achieve a material that transitions from a viscoelastic solid to a viscoelastic liquid at a temperature in a range of about 106 degrees Fahrenheit to about 110 degrees Fahrenheit. For example, higher molecular weight mixtures can yield more rigid materials that transition from one state to another at higher temperatures, and lower molecular weight mixtures yield more flexible materials that transition at lower temperatures. Exemplary polyols include an ester, ether, caprolactone, and siloxane. The isocyanate provides isocyanate groups for the reaction (i.e., acts as electrophile), and diisocyanates may be used, such as methyldiisocyanate (MDI), hexamethylene diisocyanate, and aliphatic diisocyanate. The ratio of isocyanate may also influence the hardness of the polymer. The chain extenders may include a diol to extend polymer chains, provide hydroxide groups, and influence various properties, such as flexibility or rigidity. Further, the catalyst may influence the rates of reaction, such as a metal (e.g., stannous octoate, bismuth, zinc, and the like).

The impact plate 100 may include other components that are in addition to, or in lieu of, the above listed elements. In addition, the impact plate 100 may include other thermoplastic polymers in addition (or instead of) polyurethane having the above described material properties that reflect a change in tensile properties when the temperature is elevated to between about 106 degrees Fahrenheit to about 110 degrees Fahrenheit.

In other aspects of the disclosure, the formulation of the material may provide a material that changes tensile properties at temperatures in a different range, such as between about 123 degrees Fahrenheit to about 127 degrees Fahrenheit, or between 129 degrees Fahrenheit and 133 degrees Fahrenheit. Any and all aspects, and any variation thereof, are contemplated as being within aspects herein.

Alternative Aspect of an Impact Plate

Figure 3:
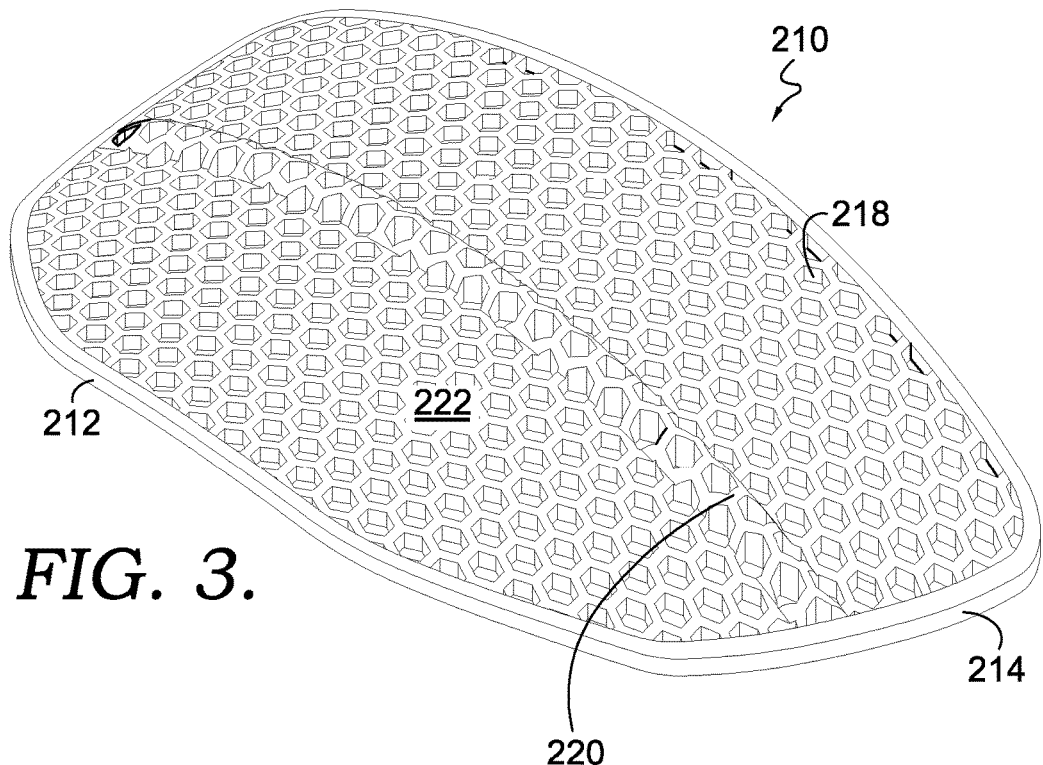
FIGS. 3-5 depict respective views of an alternative remoldable impact-attenuation plate in accordance with an aspect hereof.
Figure 4:
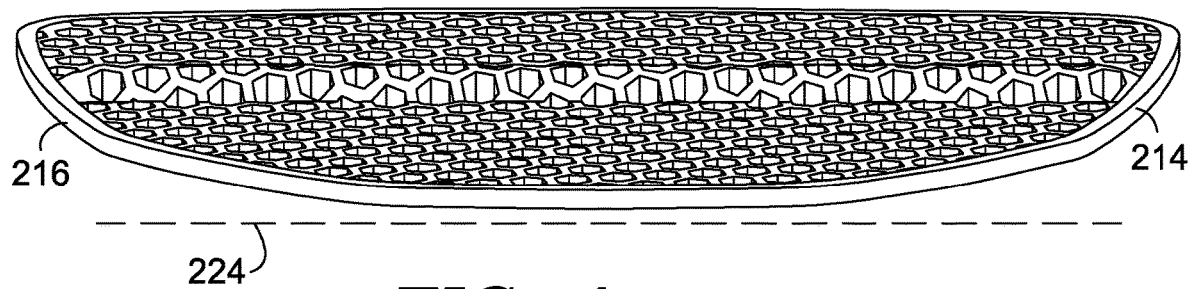
Figure 5:
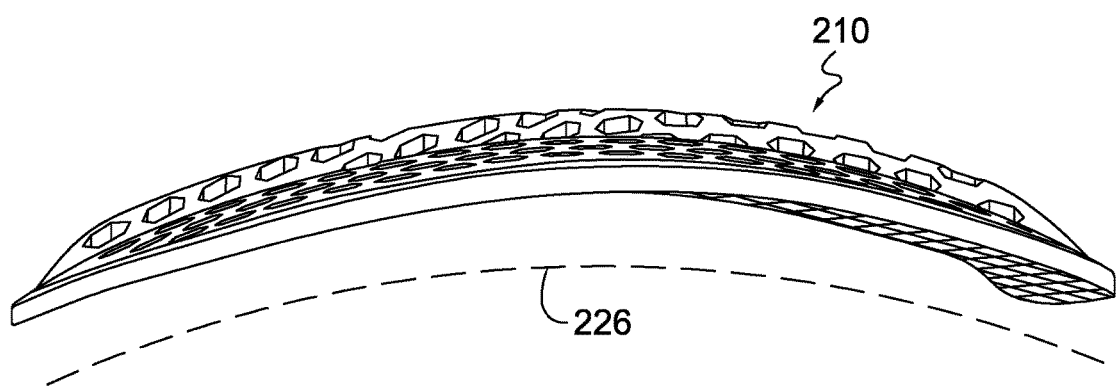

Referring now to FIGS. 3-5, another aspect of an impact plate 210 is illustratively depicted. More specifically, FIGS. 3 and 4 depict the impact plate 210 configured to include a first amount of curvature, and FIG. 5 depicts the impact plate 210 configured to include a second amount of curvature, which is greater than the first amount of curvature. Similar to the impact plate 100 described with respect to FIGS. 1 and 2, a configuration of the impact plate 210 is modifiable by elevating the temperature of the impact plate 210, applying a stress to the impact plate 210, and allowing the temperature of the impact plate 210 to lower below the softening point.

In FIG. 3, the impact plate 210 is depicted to include a bottom edge 212 and a right edge 214. The left and top edges are obscured from view in FIG. 3, and the left edge is identified by reference numeral 216 in FIG. 4. The perimeter edges form a boundary around a plate body 218, and similar to the impact plate 100, the plate body 218 includes a network of walls that form a honeycomb structure. In addition, the plate body 218 includes ribs 220 that protrude from the surface 222 of the plate body 218. In one aspect, the ribs 220 are constructed of a set of walls that are aligned along the length of the rib 220 and that include a wall height that is larger or greater than the wall heights of non-ribbed plate body 218. Among other things, the one or more ribs 220 arranged across different portions of the plate body 218 may function as an integrated support structure that assist with the retention of certain impact-plate configurations. In addition, the one or more ribs 220 may provide additional stiffening and reinforcement at select areas of the plate 210.

FIG. 4 depicts a different perspective of the impact plate 210 depicted in FIG. 3, and FIG. 4 illustrates the left edge 216 and the right edge 214. In addition, FIG. 4 depicts that the impact plate 210 includes a slight curvature extending from the left edge 216 to the right edge 214, and the curvature is represented by reference line 224. As previously indicated, the impact plate 210 is remoldable when the temperature of the impact plate 210 is elevated to a threshold temperature that is within a range of temperatures (e.g., about 106 degrees Fahrenheit to about 110 degrees Fahrenheit). FIG. 5 depicts the impact plate 210 after the configuration has been transformed, and the impact plate 210 includes a modified curvature that is greater than the curvature in FIG. 4 and is represented by reference line 226.

Referring collectively to FIGS. 1-5, the impact plates 100 and 210 may be utilized in various manners. For instance, the impact plates 100 and 210 may be protective plates that are worn on top of, beneath, or layered among other articles of apparel. In addition, the impact plates 110 and 210 may be integrated into an article of apparel or an article of equipment in various manners. For instance, the impact plates 100 and 210 may be inserted into a pocket of an article, such as a pocket in an upper-body garment, lower-body garment, or sleeve garment. In addition, the plates 100 and 210 may be affixed to an article using various coupling mechanism. For instance, the impact plates 100 and 210 may be affixed to an underlying article layer using hook-and-loop fasteners, rivets, threaded fasteners, stitching, bonding, welding, and the like.

The impact plates 100 and 210 may be donned at various positions and may be used to protect various portions of an individual's body. For instance, the impact plates 100 and 210 may be worn to cover a foot, ankle, shin, knee, thigh, hip, chest, shoulder upper arm, elbow, forearm, wrist, head, and the like. Moreover, the impact plates 100 and 210 may include (or may be incorporated into) various types of guard or protectors, such as a foot guard, ankle guard, shin guard, leg guard, thigh plate, hip plate, chest plate, shoulder cap, elbow guard, forearm guard, wrist guard, helmet, and the like. In addition, the impact plates 100 and 210 may be utilized in various activities and sports, such as American-style football, baseball, soccer, lacrosse, hockey, softball, skiing, snowboarding, motocross, and the like.

Exemplary Aspect of Article with Impact Plate

Referring now to FIGS. 6 and 7 a protective article of apparel 610 is depicted, which includes an impact plate 612 coupled to one or more layers, and FIG. 7 illustratively depicts a cross-sectional view of the protective article 610 taken along reference line 7-7 in FIG. 6. In addition, the article 610 includes a strap 614 that is usable to releasably secure the article 610 to an individual, such as to the individual's foot, ankle, leg (e.g., shin or thigh), or arm (e.g., elbow or forearm). FIG. 6 illustrates the strap 614 to include hook-and-loop fasteners, and the strap 614 may also include other releasable fasteners. In some aspects, the strap 614 may be used in combination with other garments or articles to secure the plate 612 to an individual. For example, article 610 may be strapped to an individual (e.g., to his or her ankle, shin, leg, or arm) and may be further held in place by a sleeve, sock, compression garment, and the like. However, in other aspects, the article 610 may not include the strap 614.

In an aspect of this disclosure, the impact plate 612 includes at least some of the features described with respect to the impact plate 100 and the impact plate 210. For instance, the impact plate 612 is remoldable when the impact plate 612 is heated to a temperature in a range of about 106 degrees Fahrenheit to about 110 degrees Fahrenheit. In addition, the impact plate 612 may include one or more ribs extending across one or more portions. Furthermore, the impact plate 612 may include a honeycomb structure, and the cross-sectional view depicted in FIG. 7 illustrates a series of apertures (e.g., 630) extending entirely through the impact plate 612.

The article 610 includes one or more layers to which the impact plate 612 is attached. For example, referring to FIG. 7, the layers includes a mesh substrate 616 to which the impact plate 612 is directly attached. In addition, the layers include a first foam layer 618, a second foam layer 620, and a mesh-textile layer 622 (e.g., perforated spacer mesh, air mesh, and the like).

In aspects of the present invention, the first and second foam layers 618 and 620 may provide additional cushioning and impact attenuation. Furthermore, the layers 618 and 620 may each include different respective properties and thicknesses and may be constructed of different materials. For example, the first foam layer 618 may include a composite of materials, and in one aspect the first foam layer 618 includes a composite of rubber and low-density polyethylene (e.g., 60% rubber and 40% LDPE). And in other aspects, the first foam layer 618 may include a polyamide 6 (e.g., Nylon 6) composition. The material from which the first foam layer 618 is constructed may exhibit different characteristics, such as a particular impact-attenuation performance, hydrophobicity, shrink resistance, and overall weight. In this respect, a polyamide-6 foam may provide better hydrophobicity, shrink resistance, and lower weight, as compared with a composite of rubber and low-density polyethylene. In a further aspect, the first foam layer 618 includes a thickness in a range of about 5 mm to about 7 mm.

In a further aspect of the disclosure, the second foam layer 620 may include a set of features different from the first foam layer 618. For example, the second foam layer 620 may include a polyethylene foam or other type of foam (e.g., EVA, polyurethane, etc.) having a thickness in a range of about 4 mm to about 6 mm. However, these thickness ranges are merely exemplary of one aspect of the disclosure, and other aspects may include thicknesses that are greater than, or less than, the specified ranges.

In FIG. 7 the layers also include a mesh-textile layer 622 that provides some lift of the article 610 away from a skin surface, may provide some secondary cushioning and added comfort during impact, and may also allow for breathability. The mesh-textile layer 622 may include a variety of features, such as overall thickness, aperture size, etc. For example, in one aspect the mesh-textile layer 622 includes a thickness in a range of about 4 mm to about 6 mm. Some types of mesh textiles that may be utilized in the mesh-textile layer 622 include perforated spacer mesh, air mesh, and the like.

The various layers may be coupled to one another using various techniques. For example, the layers may be bonded or adhered directly to one another, or the layers may be bonded by a trim or other textile-coupling technique. In addition, the impact plate 612 may be coupled to the one or more other layers using various coupling mechanisms. For example, the impact plate 612 may be coupled to the one or more other layers (e.g., to the mesh substrate 616) using hook-and-loop fasteners, stitching, adhesives, rivets or other mechanical fasteners, and the like.

In an aspect of the disclosure, the coupling mechanism(s) utilized to couple the layers to one another, and to couple the impact plate 612 to the one or more layers, retains a coupling functionality when the article 610 is subjected to temperatures at least about 127 degrees Fahrenheit. As such, the coupling mechanisms continue to function when the impact plate 612 is heated in order to modify a configuration of the impact plate 612. In one aspect of the disclosure, the coupling mechanism includes a low-melt thermoplastic polyurethane (e.g., flows at 118±4° C.) that is applied as a film and heat pressed. In another aspect, the coupling mechanism may include a polyurethane reactive (PUR) adhesive (e.g., flows between 120-150° C.) which can be rollered or sprayed on and then cured.

The article 610 may exhibit impact-attenuation functionality, which may be determined by standardized testing. For instance, when tested pursuant to ASTM F 1446 "Standardized Test Methods for Equipment and Procedures Used in Evaluating the Performance Characteristics of Protective Headgear," impact attenuation may be assessed based on various parameters. In one instance, the article 610 (including the above described layers 612, 616, 618, 620, and 622), may yield an average accelerated Peak (g) of between 240.0 and 243.0, between 241.0 and 242.0, or about 241.8, which is suggestive of the impact dispersement provided by the article 610. Various features may contribute to the impact dispersement, such as the thickness of each layer. In one aspect, the foam layer 618 is about 6.5 mm thick, the foam layer 620 is about 5 mm thick, and the mesh layer 622 is about 5 mm thick.

Exemplary Aspect of Other Protective Article with Impact Plate

Referring now to FIG. 8 a protective article of apparel 810 is depicted, which includes an impact plate 812 that is insertable into a pocket 814 of the article 810. More specifically, the article 810 includes a sleeve 816 that may be slid over a portion of an individual, such as over a wrist, forearm, ankle, shin, and the like. In addition, the article 810 includes an adjustment strap 818 that usable to tighten a fit of the sleeve 816. The strap 818 includes the pocket 814 that is sized to receive the impact plate 812.

In an aspect of this disclosure, the impact plate 812 includes at least some of the features described with respect to the impact plate 100 and the impact plate 210. For instance, the impact plate 812 is remoldable when the impact plate 812 is heated to a temperature in a range of about 106 degrees Fahrenheit to about 127 degrees Fahrenheit. In addition, the impact plate 812 may include one or more ribs 820 extending across one or more portions. Furthermore, the impact plate 812 may include a honeycomb structure.

Exemplary Method of Modifying a Conformation of a Plate

Figure 9:
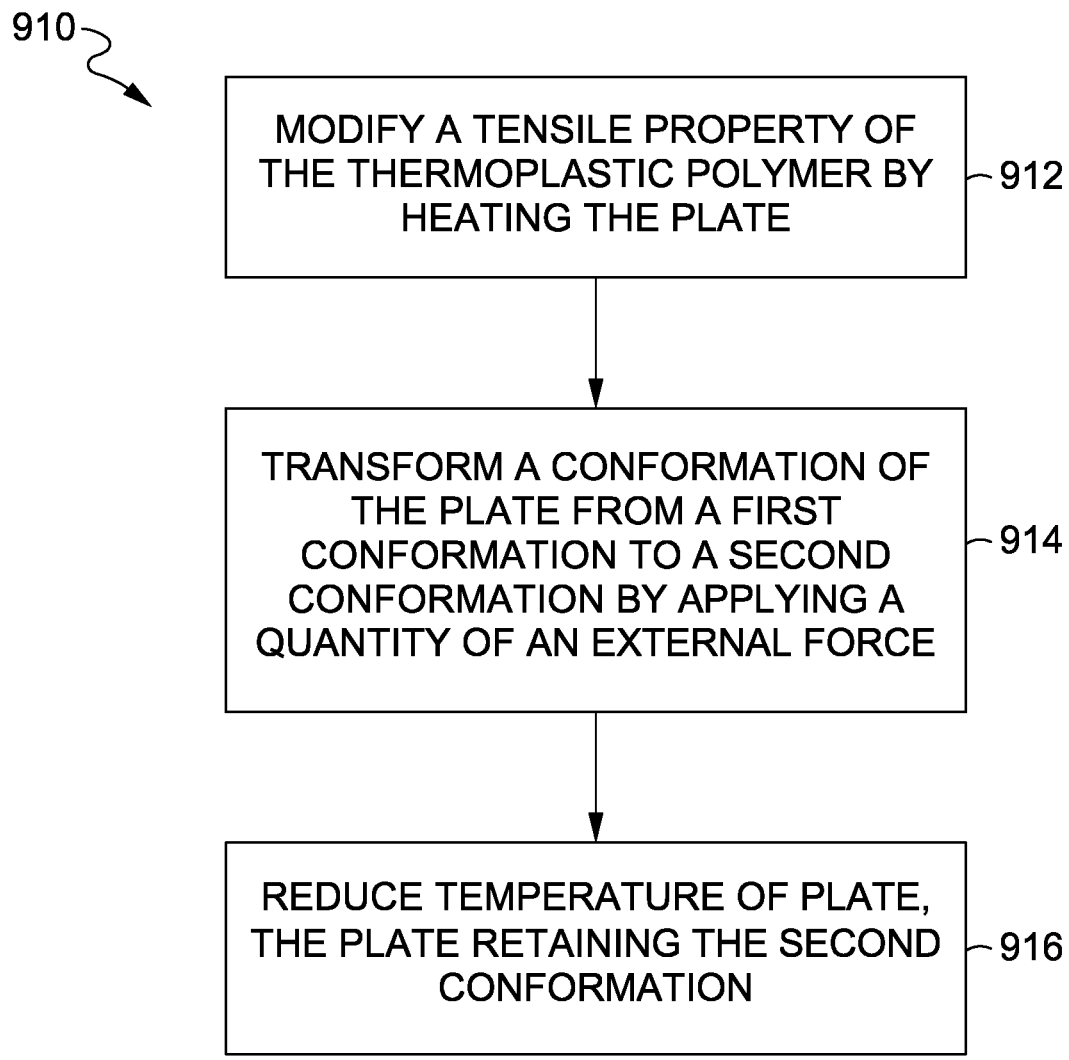
FIG. 9 depicts a flow chart that outlines steps included in a method of adjusting a configuration of a remoldable impact-attenuation plate in accordance with an aspect hereof.

Another aspect of the disclosure includes a method of modifying a conformation of a plate constructed from a thermoplastic polymer, and FIG. 9 includes a flow chart outlining a set of steps that may be carried out when performing the method 910. While describing the method 910, reference may also be made to at least some of the FIGS. 1-8.

Step 912 includes modifying a tensile property of the thermoplastic polymer by heating the plate from a first temperature to a second temperature, the first temperature being in a first range from about 60 degrees Fahrenheit to about 90 degrees Fahrenheit, the second temperature being in a second range from about 106 degrees Fahrenheit to about 110 degrees Fahrenheit. The impact plate may be heated using various techniques, such as by contacting the plate with a fluid (e.g., water or a gas) for a duration of time. For example, the duration of time might include an amount of time (e.g., two to five minutes) that is sufficient for the thermoplastic polymer to equilibrate. The fluid source might vary, depending on a particular application, and exemplary fluid sources include a hot water tap, a blow dryer, a water bath, and the like.

At step 914, a conformation of the plate is transformed from a first conformation to a second conformation by applying a quantity of external force to the plate while the plate is at a temperature in the second range. For example, the conformation of the plate might be transformed from a first curvature (e.g., FIG. 4) to a second curvature (e.g., FIG. 5). The stress may be applied using various techniques, such as by molding the impact plate around a portion of an individual's body (e.g., arm, leg, foot, etc.), over which the impact plate is configured to be worn. As such, the second conformation might include a contour that corresponds to a portion of a human anatomy (e.g., foot, leg, arm, head, torso, and the like).

Step 916 includes reducing the temperature of the plate back to a temperature in the first range, such that the plate retains the second conformation following the transforming. The plate temperature may be reduced using various techniques. For instance, the plate may be removed from a heat source (e.g., water bath, heated blown air, etc.) and allowed to cool to ambient temperature. In addition, the impact plate may be contacted with cooler fluid, such as a cool-water bath or temporarily positioned in a refrigerator or freezer.

As previously indicated, the impact plate (e.g., 100 and 210) is remoldable. As such, the method 910 may also include additional steps for making additional modifications to the impact-plate configuration. For example, the method may further include subsequently modifying the tensile property by heating the impact plate again to another temperature in the range of about 106 degrees Fahrenheit to about 110 degrees Fahrenheit. The conformation of the plate might then be transformed again from the second conformation to a third conformation by applying a quantity of external force to the plate while the plate includes a temperature in the second range. The plate retains the third conformation by allowing the temperature of the plate to be reduced to the first range.

Another aspect of the disclosure includes a kit having a remoldable plate together with instructions (e.g., written directions) for how to change a conformation of the plate. For example, the kit might include a plate having features described with respect to the plates 100 and 210. The plate might be discrete from other articles. Or the plate might be combined with an article, such as described with respect to FIGS. 6-8. In addition, the instructions might provide a step-wise explanation consistent with the method 910.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

The invention claimed is:

1. An article of apparel comprising:
a first layer of one or more materials, the first layer of the one or more materials including a first surface, a second surface, and a first-layer thickness extending between the first surface and the second surface, the first layer of the one or more materials including a plurality of sub-layers, the plurality of sub-layers including (i) one or more foam layers comprising a first foam layer and a second foam layer and (ii) one or more mesh-textile layers comprising a first mesh-textile layer and a mesh substrate layer, wherein:
the first foam layer has a thickness in a range of 5 mm to 7 mm, the first foam layer comprising only a composite of rubber and low-density polyethylene,
the second foam layer has a thickness in a range of 4 mm to 6 mm, the second foam layer comprising a polyethylene foam, and
the first mesh-textile layer has a thickness in a range of about 4 mm to 6 mm; and
a plate coupled to the second surface of the first layer of the one or more materials, the plate comprising a thermoplastic polymer having a tensile property that changes by an amount in a range of 10% to 50% when a temperature of the thermoplastic polymer is elevated from a first temperature to a second temperature, the first temperature being in a first range that is 60 degrees Fahrenheit to 90 degrees Fahrenheit, the second temperature being in a second range that is 106 degrees Fahrenheit to 110 degrees Fahrenheit, wherein the mesh substrate layer is located between the one or more foam layers and the plate, and wherein, the first foam layer is located directly adjacent the second foam layer and between the second foam layer and the plate, and wherein both of the first foam layer and the second foam layer are located between the mesh substrate layer and the first mesh-textile layer, and wherein the plate includes a network of walls that form a series of tubular cells that are hexagonal prisms in which opposing bases of each cell are open-ended.

2. The article of apparel of claim 1, wherein the first foam layer is about 6.5 mm thick and the second foam layer is about 5 mm thick.

3. The article of apparel of claim 1, wherein the one or more mesh-textile layers have a thickness of about 5 mm.

4. The article of apparel of claim 1 further comprising, an adhesive agent layered between the plate and the second surface of the first layer.

5. The article of apparel of claim 1, wherein the tensile property includes a yield strength that is lower at the second temperature.

6. The article of apparel of claim 5, wherein the tensile property includes a dynamic modulus that is lower at the second temperature.

7. The article of apparel of claim 1, wherein the thermoplastic polymer has a vicat softening temperature in a range of 106 degrees Fahrenheit to 110 degrees Fahrenheit.

8. The article of apparel of claim 1, wherein the plate further comprises one or more perimeter edges that form a boundary around a plate body, and wherein a coupling mechanism attaches the plate to the second surface of the first layer of the one or more materials at the one or more perimeter edges, the plate being detached from the second surface in a central region of the plate body.

9. The article of apparel of claim 1, wherein the plate is comprised of a mixture of polyols, an isocyanate, a chain extender, and a catalyst.

* * * * *